United States Patent Office 2,982,645
Patented May 2, 1961

2,982,645
TITANIUM PRODUCTION

Carl Marcus Olson, Newark, Del., assignor to E. I. du Pont de Nemours and Company, Wilmington, Del., a corporation of Delaware No Drawing. Filed Nov. 18, 1952, Ser. No. 321,264

12 Claims. (Cl. 75—84.5)

This invention pertains to the production of titanium metal and more specifically to an improvement in the manufacture of the pure ductile metal.

The large scale commercial production of titanium involves the reduction of titanium tetrachloride with magnesium metal. The process is usually carried out in steel reaction vessels under a protective atmosphere of argon. The reaction vessel is charged with magnesium metal, closed and purged with the inert gas. The vessel is heated to melt the magnesium. Titanium tetrachloride is then fed into the reactor at rates such that the wall temperatures do not exceed about 950° C. A slight positive pressure is maintained by supplying argon when necessary. The overall reduction reaction is shown by the equation:

$$2Mg + TiCl_4 \rightarrow 2MgCl_2 + Ti$$

It is known that intermediate reactions occur which result in the production of some lower chlorides of titanium such as $TiCl_3$ and $TiCl_2$. In practice, these lower chlorides are avoided to a large degree by keeping an excess of magnesium present. This is done simply by adding only about 85% of the stoichiometric quantity of $TiCl_4$. In spite of this precaution appreciable amounts of these lower chlorides may be found in the reaction products.

The reaction temperature is relatively far below the melting point of the titanium metal, 1725° C. As a result the product is a porous spongy mass of metal having its ports filled with the other reaction products comprising large quantities of $MgCl_2$, the unreacted magnesium and the lower titanium chlorides. The $MgCl_2$ is molten at the reaction temperatures and up to about 85% of it may be drained out of the reactor during and after the reaction. There remains therefore, a major separation step before the pure ductile metal is isolated. Two basically different methods have been employed. One is vacuum distillation. The drained sponge is heated to around 950° C. for as much as 24 hours under high vacuum. All the contaminating by-products are thought to be quite volatile under these conditions. Surprisingly, however, the residual magnesium which has a lower boiling point than the $MgCl_2$ is most difficult to remove completely. The vacuum distillation is tedious and the method is penalized by high investment costs. The other procedure is leaching with a suitable solvent for the several by-products. Usually acidified water is most practical. In order to facilitate the leaching, the sponge-salt mass may be milled into small lumps. Essentially all traces of by-product residues can be removed by this leaching process. Unfortunately, however, the leached sponge becomes hardened by trace amounts of oxygen and hydrogen. This hardening, even though limited, prevents achieving a ductile product. Thus, while it may in some instances be forged, it frequently cannot be drawn or rolled into sheet.

I have now discovered means by which the undesirable features of the two foregoing methods may be avoided. This invention has an object the essentially complete removal of contaminating by-product material. Another object is the removal of these materials without introducing other hardening elements such as hydrogen and oxygen.

These and other objects and advantages are attained by my invention which broadly comprises subjecting the refractory metal reaction products from the reduction of the fourth group refractory metal chlorides, such as the chlorides of titanium and zirconium, with reducing metals selected from the alkali metals and the alkaline earth metals, e.g. magnesium, sodium and calcium, to temperatures above 1000° C. in a non-contaminating atmosphere, while in association with by-products of the reduction reaction, cooling, leaching, preferably in acidified water, and recovering the purified titanium metal.

A specific embodiment of the invention comprises removing the titanium sponge mass and its associated by-product mixture, containing $MgCl_2$, magnesium and lower chlorides of titanium, from the vessel in which these products were made by interaction of $TiCl_4$ and the reducing metal, i.e., magnesium, transferring said sponge and associated products to a graphite lined retort, purging with argon, and heating contents of said retort to temperatures above 1000° C. but not above the boiling point of the by-product salt or about 1400° C., e.g. between about 1100° C. and 1400° C. for from 4 to 12 hours, cooling, removing from said retort and leaching with acidified water to remove magnesium and $MgCl_2$ and recovering the purified ductile titanium.

In a further adaptation the reaction products containing titanium sponge, and at least a portion of the by-products, may be milled or ground to particulate form, such as about one inch lumps, to facilitate leaching, this milling step may be performed either before or after the heat treatment step of this invention. When the milling is done before the heat treatment, it is desirable to protect the reaction product mixture from contaminating atmosphere. In this case, moisture is the most harmful since it is so readily picked up by the chloride salts, hence providing an atmosphere of dry air is suitable, altho for absolute protection dry argon is preferred. When milling is done after the heat treatment no special precautions are needed other than to mill at rates which do not overheat the metal thus causing oxidation and nitridation. A non-contaminating or non-reactive atmosphere, i.e. an atmosphere free of nitrogen and oxygen, in contact with the titanium is essential during the heating step. Generally, it is most convenient to provide the inert atmosphere by use of a rare gas such as helium or argon. However, the vapors of the by-product salt are also inert toward the metal and hence they may be included in the term "non-contaminating atmosphere," or "inert atmosphere." While substantial vaporization of the salt is not generally contemplated it is within the scope of this invention to allow the free space of a heat treating retort to fill with the salt vapors. Similarly, the vapors of the reducing metal are non-contaminating since, like the salts, they are removed by leaching.

While it is possible to obtain improvement according to this invention by heating for several hours at about 1000° C. in an iron vessel without undue iron contamination it is preferable to use a graphite or graphite lined vessel for the heat treatment. Higher temperatures may then be used and the time correspondingly shortened. The temperatures used may range upward from 1000° C. to the neighborhood of the melting point of the refractory metal. However, when titanium is melted in graphite considerable carbon contamination occurs. Also the diffusion of carbon into any contacting solid titanium is quite marked at temperatures in excess of about 1500° C. Furthermore, since this invention is valuable as a means of avoiding an expensive distillation step, the evaporation of substantial amounts of salt, etc., is not usually contemplated. In view of this, the practical upper temperature limits when operating at atmospheric pressure will be the boiling points of the respective by-product salts. Provision may be made for the escape of minor amounts of volatile materials such as reducing metal vapors, or titanium chlorides. The boiling point of the by-product salts may be raised by the use of pressure vessels so that heating to higher temperatures may be practiced. The choice of temperature will be influenced by the time required, the cost of operating, and, in the case of the higher temperature, the amount of diffusion of carbon into the titanium.

The heat treatment is preferably carried out with sponge from which a portion of the by-product salt has been removed. Usually all free flowing molten salt is allowed to drain from the reactor. It has been noted that, during the heat treatment according to this invention, more salt is liberated and drains out. Accordingly, it is frequently desirable to provide draining conditions during the heat treatment. Thus, the heating vessel may be provided, for example, with a perforated false bottom through which liberated salt may leave the sponge.

The leaching with acidified water adjusted to pH value of from about 1 to 3 with HCl, as herein disclosed and preferred, is economical and satisfactory in most cases. However, it is within the scope of this invention to associate the heat treatment with leaching in stronger acid, and other acids such as sulfuric, acetic, etc. Although hydrofluoric acid is not desirable in the presence of magnesium because of the formation of insoluble $MgF_2$, this acid may be used in the final washes after magnesium is removed to dissolve traces of titanium oxide. Other solvents such as alcohol and the use of modifying agents in the acid solution are also contemplated in connection with this improved process.

A more detailed description of this invention is provided in the following examples.

Example I

Sponge titanium was prepared according to the method outlined in U.S. Patent 2,205,854. After the reaction and draining steps were completed the reactor was allowed to cool and the contents bored out of the reactor in a dehumidified room. The borings were collected in a large graphite crucible and placed in an electrically heated crucible furnace. The crucible was covered and the furnace closed, flushed three times with argon and the heat turned on. Temperature was measured by a graphite covered thermocouple mounted in the furnace cover and extending just into the charge. After 4 hours at 1300° C. the furnace and charge were cooled and opened. The contents of the crucible had shrunk considerably. It could be dumped from the crucible and crushed prior to leaching. This was done in ordinary air. The crushed product was leached five times with ten parts of aqueous hydrochloric acid at pH 3 and then twice with water. After drying, the metal sponge was sampled and analyzed for nitrogen, oxygen, hydrogen and magnesium chloride. The analytical data follows:

| | Percent |
|---|---|
| Nitrogen | 0.01 |
| Oxygen | 0.05 |
| Hydrogen | 0.001 |
| $MgCl_2$ | 0.03 |

This metal when melted to ingots, could be rolled and drawn into wire and other shapes. Sponge prepared in the same manner, but not subjected to the heat treatment step prior to leaching, contained 0.01% nitrogen, 0.2% oxygen, 0.03% hydrogen and 0.3% $MgCl_2$. Considerable difficulty was encountered in arc melting of this product due to spattering because of the high volatile content. The ingot metal could be forged but was too hard to be satisfactorily rolled or drawn.

Example II

Two thousand pounds of magnesium ingots were placed in a cylindrical steel reactor having a mild steel liner and means at the bottom for draining off molten salt during the reduction. The reactor was closed, evacuated, flushed with argon, and heated until the major portion of the magnesium was melted. Titanium tetrachloride was then admitted and reacted with the magnesium at a controlled rate such that the reactor wall temperature did not exceed about 900° C. From time to time the molten magnesium chloride was drained off. When about 85% of the theoretical amount of $TiCl_4$ had been added the addition was stopped, another increment of $MgCl_2$ drained out and the reactor cooled. The product mass consisted about equal weights of titanium sponge and magnesium chloride and smaller amounts of magnesium and some titanium lower chlorides. This mass was removed from the reactor and the iron liner in a dry room and milled to about one inch lumps. A major portion of the lumps were transferred dry to graphite crucibles which were then closed, flushed with argon and heated to 1050–1100° C. for 7 hours, cooled and discharged. Representative samples of the heat treated portion and the non-heat treated portion were leached in a tumbling barrel with 50 gallons of water, adjusted to 2 pH with HCl, per 100 pounds of product. Four acid leachings were made followed by two water washes. After air drying at about 120° C. the sponge was analyzed and portions of each type melted in an arc furnace and further examined. The results are shown in the following table.

| | Heat Treated | Non-heat Treated |
|---|---|---|
| Leached sponge: | | |
| Percent Oxygen | 0.01 | 0.1 |
| Percent Nitrogen | | |
| Percent $MgCl_2$ | 0.03 | 0.25 |
| Percent Hydrogen | 0.001 | 0.025 |
| Arc Melting | smooth | spattered |
| Vickers Hardness | 125 | 180 |

In Example II the heat treatment reduces the hardness (Vickers hardness number) by lowering the oxygen pickup resulting in greater ductility. Furthermore, the arc melting operation was difficult in the case of the non-heat treated sponge due to gasing of $H_2$, $MgCl_2$, etc. The treated sponge melted quietly and gave a more perfect ingot.

This heating is a rather simple operation and so far as is known the theoretical aspects are fairly simple. At the conclusion of the reaction the titanium sponge is in a condition of relatively high surface area and may contain fine pyrophoric powders. In addition to the $MgCl_2$ there is some magnesium metal and some lower chlorides of titanium such as $TiCl_2$ or $TiCl_3$. On leaching this product with water the lower chlorides may hydrolyze to precipitate titanium oxygen compounds not readily flushed out of the fine sponge structure. The ultimate oxygen content and hardness of the titanium are thus increased. The magnesium dissolves in the acid liberating hydrogen which is absorbed in the titanium causing it to disadvantageously gas during melting. The fine active titanium surfaces themselves may react with the aqueous solution to cause oxygen contamination, particularly when local heating occurs as a result of the heat of solution of $MgCl_2$. All these difficulties are overcome by the use of the heat treatment prior to leaching. The heat treatment is thought first to cause the excess magnesium to migrate and eliminate the lower chlorides of titanium by their complete reduction. Heating also causes coalescence and decrease of the surface activity of the titanium sponge making it less susceptible to both hydrogen and oxygen contamination. The collapse of the fine sponge structure under heat is thought also to liberate trapped $MgCl_2$ resulting in substantially complete removal of it by leaching as shown.

The milling step is a preferred companion operation which seems to perform two functions aside from getting the product out of the reactor in certain instances. It undoubtedly assists in opening pockets of occluded impurities. Further, the reduction to granular form permits the agitation of the leaching batch which in turn prevents concentrating the heat of solution with the attendant contamination.

The heat treatment is primarily advantageous when followed by leaching since its action improves the stability of the sponge during leaching. It has been noted, however, that the unleached sponge may be stored in air after heat treatment prior to leaching without bad effect. This is not possible in the absence of heat treatment. Other major advantages concern the elimination of the expensive vacuum distillation step by the substitution of heat treatment without substantial evaporation of by-product salt and an aqueous leach. In a practical sense the process of this invention, which avoids the long vacuum distillation, results in improved quality due to lower nitrogen content. Since it is not necessary to maintain high vacuum in the apparatus there is very little chance for inleakage of air. This inleakage of air and consequent nitrogen contamination is very difficult to avoid in the vacuum distillation which frequently requires as much as 20 hours.

I claim as my invention:

1. The improvement in processes for the production of a ductile fourth group refractory metal selected from the group consisting of titanium and zirconium, by the reduction of its chloride with an active reducing metal selected from the group consisting of the alkali metals and alkaline earth metals including magnesium to yield a sponge-like product mixed with by-product salt which comprises heating the metal product, after the conclusion of the reduction reaction step, in the presence of said by-product salt to temperatures above 1000° C. and to about 1400° C. but not above the boiling point of the by-product salts in a non-contaminating atmosphere for from 4–12 hours and then cooling, leaching it with an aqueous solvent to remove soluble material therefrom, and recovering the purified fourth group metal.

2. The improvement in processes for the production of ductile titanium metal by the reduction of titanium chloride with an active reducing metal selected from the group consisting of the alkali metals and alkaline earth metals including magnesium to yield a sponge-like product mixed with by-product salt which comprises heating the metal product, after the conclusion of the reduction reaction step, in the presence of said by-product salt to a temperature above 1000° C. and to about 1400° C. but not above the boiling point of the by-product salts in non-contaminating atmosphere for from 4–12 hours, subsequently cooling, leaching it with an aqueous solvent to remove soluble material therefrom and recovering the purified titanium metal.

3. The improvement in processes for the production of ductile zirconium metal by the reduction of zirconium chloride with an active reducing metal selected from the group consisting of the alkali metals and alkaline earth metals including magnesium to yield a sponge-like product mixed with by-product salt which comprises heating the metal product, after the conclusion of the reduction reaction step, in the presence of said by-product salt to a temperature above 1000° C. and to about 1400° C. but not above the boiling point of the by-product salts in non-contaminating atmosphere for from 4–12 hours, subsequently cooling, leaching it with an aqueous solvent to remove soluble material therefrom and recovering the purified zirconium metal.

4. An improved process for the production of titanium metal sponge in purified form which comprises preparing the sponge by the reduction of titanium chloride with an active reducing metal selected from the alkali and alkaline earth metals including magnesium in a closed reaction vessel, heat treating the sponge product, after the conclusion of the reduction reaction step, under an inert atmosphere at temperatures in excess of 1000° C. and to about 1400° C. but not above the boiling point of the by-product salts for from 4–12 hours while in association with the by-products of the said reaction, removing the water and acid soluble materials present in said heat treated sponge by aqueous leaching and washing treatment, drying and recovering the purified sponge.

5. The improvement in processes for the production of ductile titanium metal by the reduction of titanium chloride with an active reducing metal selected from the group consisting of the alkali metals and alkaline earth metals including magnesium to yield a sponge-like product mixed with by-product chloride salt which comprises heating for from 4–12 hours the titanium metal product of the reaction and its associated salt by-product, after the conclusion of the reduction step, in a closed vessel and under draining conditions to remove said salt from said product, and in a non-contaminating atmosphere to temperature above 1000° C., but below the melting point of titanium and below the boiling point of said by-product chloride salt under the pressure prevailing in the heat treating vessel, cooling the heat-treated product, leaching it in aqueous acid to remove soluble material, and recovering the purified titanium.

6. The improvement in the production of ductile titanium by the reduction of titanium tetra-chloride with magnesium which comprises subjecting the un-refined sponge product, after the conclusion of the reduction reaction step, to temperatures ranging from 1000° C. to about 1400° C. for from 4–12 hours in a non-contaminating atmosphere without substantial evaporation of its associated magnesium chloride, cooling, subjecting to aqueous leaching to remove soluble contaminants including magnesium and magnesium chloride, and recovering the purified titanium metal.

7. A process for obtaining purified ductile titanium from the reaction product resulting from the reduction of titanium tetrachloride with magnesium, said reaction product containing magnesium, magnesium chloride, and some lower titanium chloride mingled with sponge titanium, which comprises heating said reaction product, after the conclusion of the reduction reaction step, in a graphite lined vessel and under an inert atmosphere, to temperatures between 1100° C. and 1400° C. for from 4–12 hours without substantial vaporization of the magnesium chloride, cooling the heat-treated product, milling it to particulate form, leaching in water adjusted to pH values ranging from 1 to 3, washing, and then drying and recovering the purified titanium.

8. A process for obtaining purified, ductile titanium from the reaction between titanium tetrachloride and magnesium which comprises milling the products of said reaction to particulate form in a dry atmosphere, heating the milled material in a graphite vessel and under an inert gas atmosphere to temperatures between 1100° C. and 1400° C. for from 4–12 hours, without substantial vaporization of the magnesium chloride present, cooling the heat-treated product, leaching it in aqueous acid having pH values between 1 and 3, and then washing, drying, and recovering the purified titanium metal.

9. A process for preparing ductile titanium which comprises reacting magnesium and titanium tetrachloride in a closed steel reactor, the walls of which are maintained below about 950° C., draining up to 85 per cent of the molten by-product magnesium chloride away from the metal product, transferring the product metal along with the associated remaining by-product salts and residual magnesium to a milling station and milling, while blanketed with dry air, to particulate form, transferring the milled product to a closed graphite vessel, heating under a non-contaminating atmosphere to temperatures between 1100° C. and 1400° C. for from four to twelve hours, cooling, leaching the milled heated product in acidified water adjusted to pH values between 1 and 3, washing, drying and recovering the purified titanium.

10. The improvement in processes for the production of ductile fourth group refractory metal selected from the group consisting of titanium and zirconium, by the reduction of its chloride with an active reducing metal selected from the group consisting of the alkali metals and alkaline earth metals including magnesium to yield a sponge-like product mixed with by-product salt which comprises heating the drained metal product, after the conclusion of the reduction reaction step, in the presence of residual salt to temperatures from above 1000° C. to about 1400° C. but not above the boiling point of the by-product salts for from 4–12 hours in a non-contaminating atmosphere and then cooling, leaching the metal product with an aqueous solvent to remove soluble material therefrom and recovering the purified fourth group metal.

11. The process of claim 10 in which the fourth group metal is titanium.

12. The improvement in the processes for the production of ductile titanium by the reduction of its tetrachloride with sodium to yield titanium metal product mixed with by-product sodium chloride which comprises heating the metal product, after the conclusion of the reduction reaction step, in the presence of said by-product sodium chloride to a temperature of about 1000° C. and not above the boiling point of said sodium chloride in a non-contaminating atmosphere for several hours and then cooling, leaching the metal product with an aqueous solvent to remove soluble material therefrom, and recovering purified titanium.

References Cited in the file of this patent

UNITED STATES PATENTS

| | | |
|---|---|---|
| 2,214,211 | Zeppelin et al. | Sept. 10, 1940 |
| 2,482,127 | Schlechten et al. | Sept. 20, 1949 |
| 2,556,763 | Maddex | July 12, 1951 |
| 2,663,634 | Stoddard et al. | Dec. 22, 1953 |

FOREIGN PATENTS

| | | |
|---|---|---|
| 632,564 | Great Britain | Nov. 28, 1949 |
| 639,840 | Great Britain | June 14, 1950 |
| 658,213 | Great Britain | Oct. 3, 1951 |

OTHER REFERENCES

Handbook of Chemistry and Physics, 26 Ed.; published 1942 by Chem. Rubber Pub'l. Co., Cleveland; pages 362, 363, 440 and 441.

Metal Industry, October 8, 1948; pages 283–286.

The Mining Journal, vol. 239, July 25, 1952, page 95.